United States Patent [19]
Yamamoto et al.

[11] Patent Number: 6,130,658
[45] Date of Patent: Oct. 10, 2000

[54] BACK LIGHT ASSEMBLY FOR FLAT PANEL DISPLAY

[75] Inventors: Koichi Yamamoto; Dai Yoneya, both of Tokyo; Takayoshi Omori, Kanagawa, all of Japan

[73] Assignee: Sony Corporation, Tokyo, Japan

[21] Appl. No.: 08/940,976

[22] Filed: Sep. 30, 1997

[30] Foreign Application Priority Data

Sep. 30, 1996 [JP] Japan ..................................... 8-279948

[51] Int. Cl.[7] ...................................................... G09G 3/36
[52] U.S. Cl. ............................................ 345/102; 361/681
[58] Field of Search ................................ 345/87, 32, 102, 345/215; 349/62, 65, 70, 58, 95; 362/27, 30, 31, 29; 361/681, 682

[56] References Cited

U.S. PATENT DOCUMENTS

| | | |
|---|---|---|
| 5,272,601 | 12/1993 | Mekillip ..................................... 362/30 |
| 5,396,350 | 3/1995 | Beeson et al. ............................. 349/65 |
| 5,666,172 | 9/1997 | Ida et al. .................................... 349/65 |
| 5,831,697 | 11/1998 | Evanicky et al. ......................... 349/65 |

*Primary Examiner*—Chanh Nguyen
*Attorney, Agent, or Firm*—Hill & Simpson

[57] ABSTRACT

Disclosed is a flat display allowed to facilitate a maintenance work for a back light unit contained in the flat display. The flat display includes a frame, display unit, back light unit, and chassis. The frame is positioned on the front side and has a window portion. The display unit, which is of a transmission type and is formed in a flat shape, is assembled from the rear side to the frame in such a manner as to be matched with the window portion to form an image screen. The chassis is positioned on the rear side and is engaged with the frame while putting the display unit therebetween to form a flat containing space on the back surface side of the display unit. The back light unit 3 is a surface light source which is pre-assembled using a flat case, and is removably insertable in the containing space. The back light unit functions to illuminate the transmission type display unit from the back surface side.

8 Claims, 5 Drawing Sheets

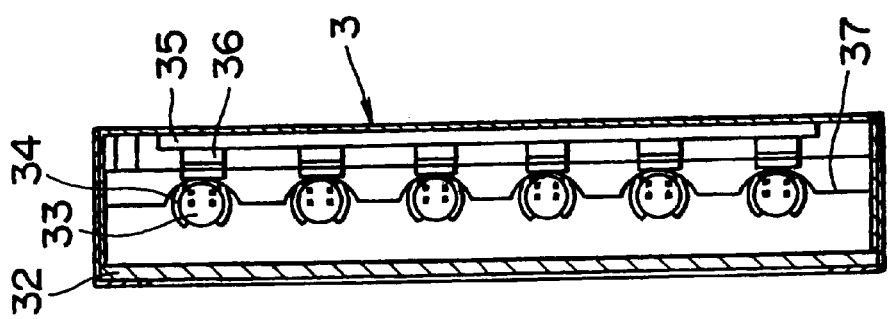
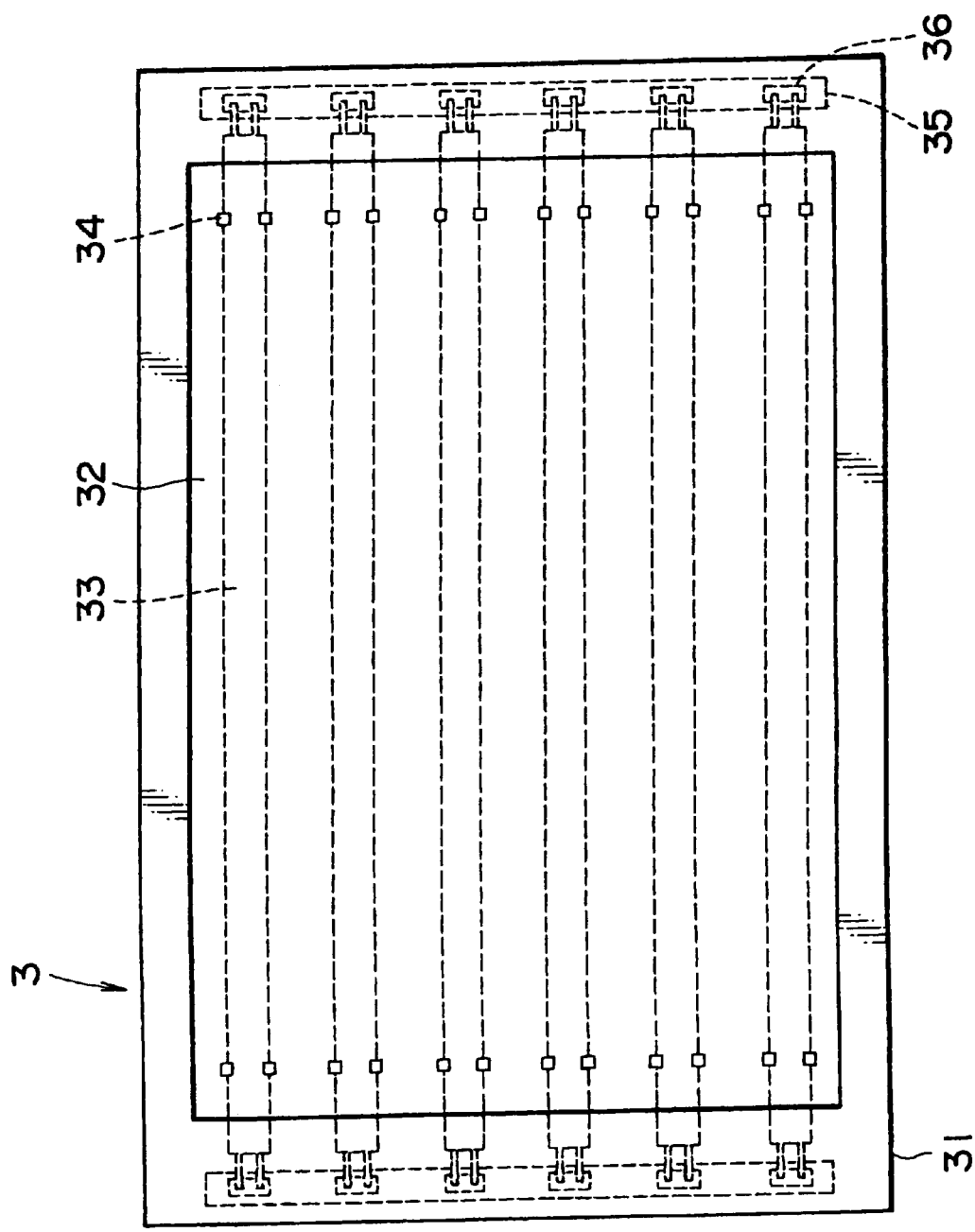

BACK LIGHT ASSEMBLY FOR FLAT PANEL DISPLAY

BACKGROUND OF THE INVENTION

The present invention relates to a flat display, and particularly to a structure of a flat display in which a transmission type display unit such as a liquid crystal panel is assembled with a back light unit for illuminating the display unit from the back surface side.

In recent years, development has been extensively made of flat displays having flat shapes differently from CRTS. In particular, active matrix type or plasma addressed type liquid crystal panels become a focus of attention as devices capable of attaining a large screen or displaying dynamic images. The liquid crystal panel, which is not of a spontaneous light emission type, needes to use external light for display, and it is mainly classified as either a reflection type or a transmission type. The transmission type is illuminated from the back surface side, and thereby it requires a back light. Thus, a display unit composed of a transmission type liquid crystal panel is assembled with a back light unit including lamps such as fluorescent lamps, to form a flat display set.

In the related art flat display set, a liquid crystal panel and a back light have been integrally fixed on the set. However, the back light using fluorescent lamps as a light source has a specific service life, and thereby it must be replaced. In this case, when the back light is taken out of the set for replacement, various parts such as a liquid crystal panel and a drive circuit board must be simultaneously removed. In other words, the maintenance work for the flat display has been complicated. Further, since wirings for lamps such as the fluorescent lamps used as a light source in the back light are fixed by soldering, handling of the wirings thus fixed by soldering has been laborious in the replacement of the back light. That is, the related art flat display has failed to examine the exchangeability of the burned out lamps and the like. Taking into account the tendency that a large sized liquid crystal panel will be mainly used for the flat display applications in the future, the exchangeability of the back light becomes important for increasing the commercial worth of the flat panel.

SUMMARY OF THE INVENTION

An object of the present invention is to provide a flat display capable of facilitating maintenance work for a back light unit contained in the flat display.

To achieve the above object, according to the present invention, there is provided a flat display including: a frame positioned on the front side of the flat display and formed with a window portion; a display unit having a transmission type flat panel, the display unit being assembled from the rear side to the frame in such a manner as to be matched with the window portion to form a display screen; a chassis positioned on the rear side of the flat display, the chassis being engaged with the frame while putting the display unit therebetween to form a flat containment space on the back surface side of the display unit; and a back light unit as a surface light source for illuminating the display unit from the back surface side, the back light unit being pre-assembled using a flat case and removably insertable in the containing space.

The display unit preferably include: optical parts, formed in flat shapes, for diffusing and/or collecting illuminating light coming from the back light unit; and a liquid crystal panel for modulating the illumination light in accordance with an image signal inputted from the outside and creating an image on the screen; wherein the optical parts are separated from the removable back light unit and are joined to the back surface of the liquid crystal panel.

The optical parts preferably includes a light diffusion plate for diffusing illumination light in both the vertical and horizontal directions of the screen; and a prism sheet for collecting the illumination light, which has been once diffused, at least in the vertical direction.

The liquid crystal panel preferably includes: scanning lines composed of discharge channels extending in the horizontal direction and arranged with a specific pitch in the vertical direction; signal lines composed of signal electrodes extending in the vertical direction and arranged with a specific pitch in the horizontal direction; and pixels composed of liquid crystal, interposed at crossing points between the scanning lines and the signal lines.

The back light unit preferably has a light diffusion plate having a relatively high light-transmittance and mounted on the front side of the back light unit. Further, the display unit preferably has a light diffusion plate having a relatively low light-transmittance and mounted on the rear surface of the display unit.

The display unit preferably has a structure in which a space formed between the liquid crystal panel and the optical parts are enclosed from the exterior.

In the flat display of the present invention, the display unit including a liquid crystal panel and the back light unit containing lamps are separately assembled using the frame and the chassis. In this flat display, since the back light unit is removable from the flat display together with the case, exchange of lamps can be easily performed.

BRIEF DESCRIPTION OF THE DRAWINGS

FIG. 3A is a plan view and FIG. 3B is a side view showing a back light unit assembled in the flat display shown in FIG. 1;

DETAILED DESCRIPTION OF THE PREFERRED EMBODIMENT

Figure 1:
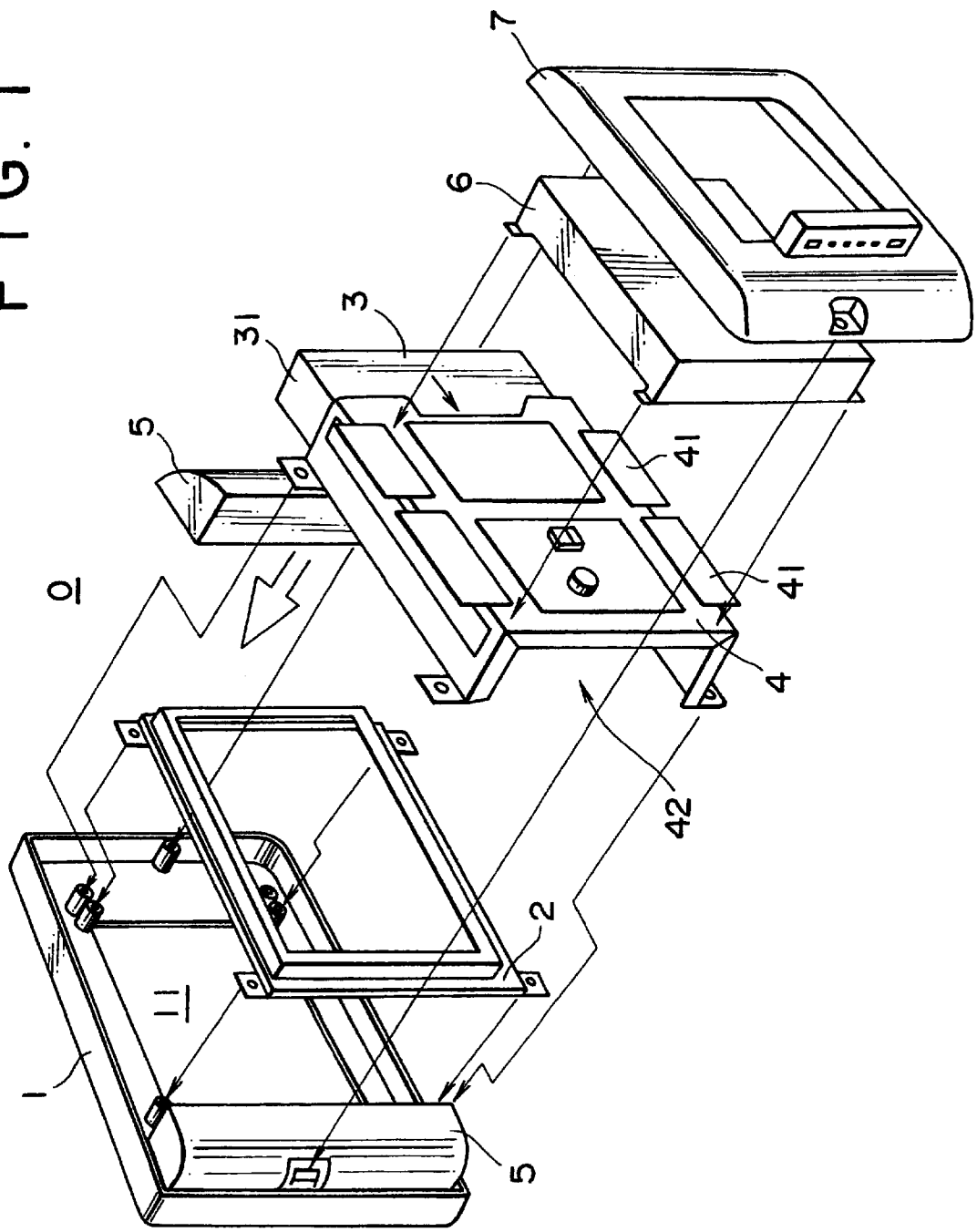
FIG. 1 is an exploded perspective view of one embodiment of a flat display according to the present invention.

Hereinafter, a preferred embodiment of the present invention will be described with reference to the accompanying drawings. Referring first to FIG. 1, there is shown an exploded view in perspective of a basic structure of a flat display 0 of the present invention. The flat display 0 basically includes a frame 1, a display unit 2, a back light unit 3, and a chassis 4. In addition, the flat display 0 is also provided with a pair of speakers 5, a shield cover 6, and a rear cover 7. The bezel type frame 1 is positioned on the front side of the flat display 0 and has a window portion 11. The display unit 2 of a transmission type, which is formed in a flat shape, is assembled from the rear side to the frame 1 with screws or the like in such a manner as to be matched with the window portion 11 to form an image screen. On the screen is created a video image, television image, computer graphic image or the like. The chassis 4 is positioned on the rear side of the flat display 0, and is engaged with the frame 1 with screws or the like while putting the display unit 2 therebetween. The chassis 4 is U-shaped in cross-section to form a flat containing space 42 on the back surface side of the display unit 2. On the back surface side of the chassis 4, are mounted circuit boards 41 for driving the display unit 2. The back light unit 3, which is pre-assembled using a flat case 31, is a surface light source containing a light source such as fluorescent lamps. The back light unit 3 is removably insertable in the above-described containing space 42, and it functions to illuminate the transmission type display unit 2 from the back surface side thereof. In this way, according to the present invention, the back light unit 3 can be removably inserted in the containing space 31 together with the case 31, with a result that a maintenance work such as exchange, or replacement of the fluorescent lamps can be very easily performed. The pair of speakers 5 are assembled in the right and left sides of the frame 1. The shield cover 6 is mounted on the chassis 4 for shielding the circuit boards 41. The rear cover 7 is mounted on the back surface side of the frame 1 for protecting the display unit 2, back light unit 3, chassis 4 and the like. In the flat display thus assembled, only the frame 1 and the rear cover 7 are exposed.

Figure 2A:
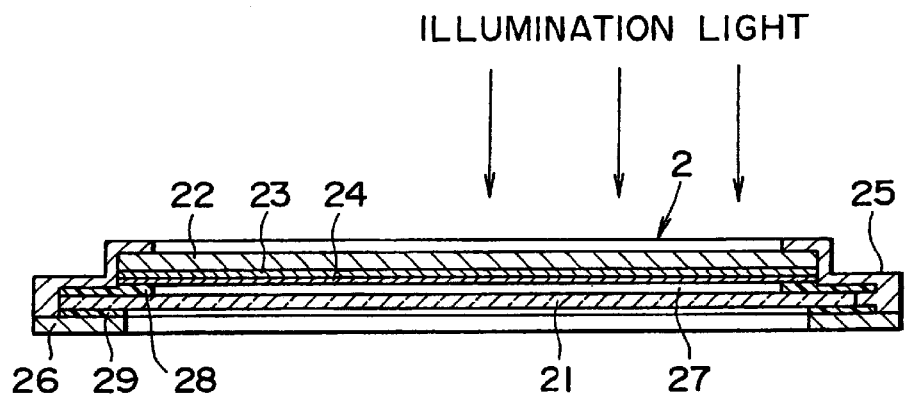
FIGS. 2A and 2B are a sectional view and an exploded perspective view, respectively, showing a display unit assembled in the flat display unit shown in FIG. 1.
Figure 2B:
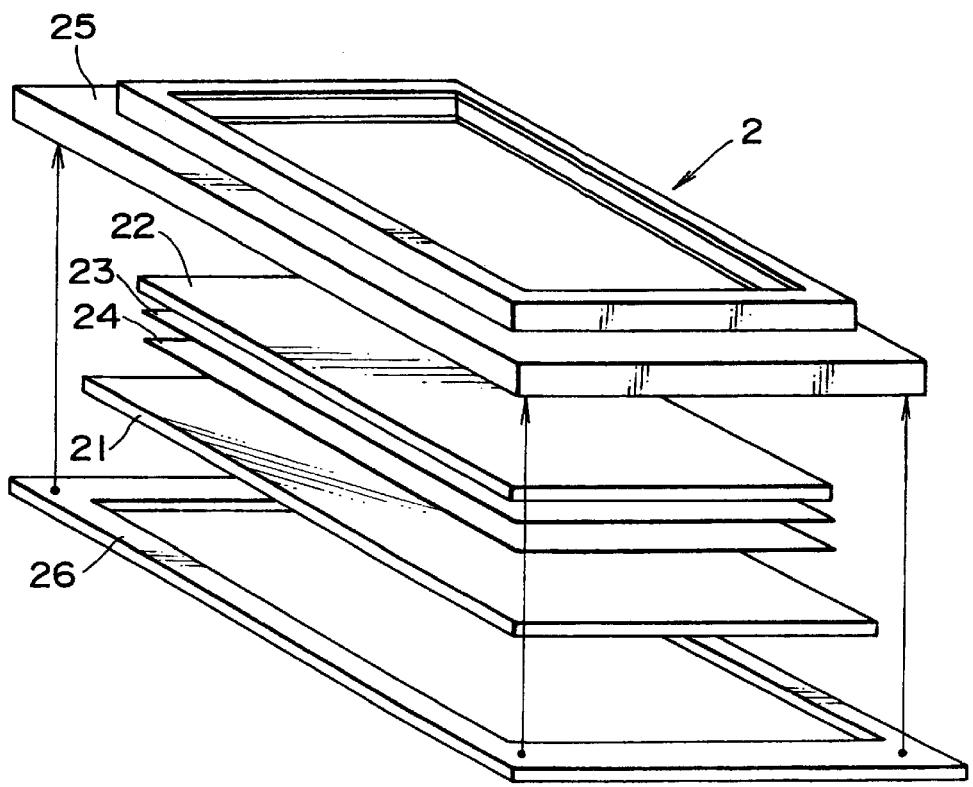

FIG. 2A is a sectional view showing a detailed configuration example of the display unit 2 shown in FIG. 1, and FIG. 2B is an exploded view in perspective of the configuration example shown in FIG. 2A. As shown in these figures, the display unit 2 is assembled using a housing 25. A light diffusion plate 22, two prism sheets 23 and 24, and a liquid crystal panel 21 are assembled in the housing 25 in this order. A support frame 26 is then fixed to the housing 25 with screws. An integral type display unit 2 is thus obtained. The liquid crystal panel 21, having a pair of laminated substrates typically made from typically glass, is assembled in the housing 25 with cushion members 28 and 29 put on both sides thereof for preventing the liquid crystal panel 21 from receiving a shock or the like from the outside. Since the cushion member 28 is interposed between the prism sheet 24 and the liquid crystal panel 21, there exists a gap 27 in the housing 25 at a position between the prism sheet 24 side and the liquid crystal panel 21 side.

As described above, the display unit 2 in this embodiment includes the light diffusion plate 22 and the prism sheets 23 and 24 as plate-like optical parts for diffusing and/or collecting illumination light coming from the back light unit 3 (see FIG. 1). The liquid crystal panel 21 modulates the illumination light in accordance with an image signal that is inputted to the display and creates an image on the screen. In the display unit 2 having such a configuration, of the above-described optical parts, the light diffusion plate 22 is separated from the removable back light unit (see FIG. 1) and is joined on the back surface of the liquid crystal panel 21. In general, the light diffusion plate and the prism sheets as the optical parts have been mounted on the front surface of the back light side. By contrast, according to the present invention, these plate-like optical parts are separated from the case 31 of the back light unit 3 and are mounted on the display unit 2 side. As a result, when the case 31 of the back light unit 3 is taken out of the flat display set for exchange of lamps, the optical parts remain fixed in the set, and accordingly they can be prevented from being damaged and/or contaminated. In fixture o f the optical parts such as the light diffusion plate 22 and the prism sheets 23 an d 24, the area from the back surface of the liquid crystal panel 21 to the front surface of the light diffusion plate 22 are enclosed by the housing 25 and the support frame 26. Hence, even in the case of using a fan or the like for cooling the back light unit 3, there is no fear that dust can permeate in the display unit 2. In particular, since foreign matter such as dust does not adhere on the surface of the light diffusion plate 22, a clear display image can be obtained. In addition, any dust probably adheres on the exposed back surface side of the light diffusion plate 22; however, such a phenomenon little affects the display image because of the diffusion effect of the light diffusion plate 22. The gap 27 formed in the display unit 2 at the position between the liquid crystal panel 21 and the prism sheet 24 where they are joined to each other is enclosed from the outside, and consequently is not subject to introduction of foreign matter.

FIG. 3A is a plan view and FIG. 3B is a side view, showing a detailed configuration example of the back light unit 3 shown in FIG. 1. The back light unit 3 is assembled using the case 31, and it contains six fluorescent lamps 33 as a light source. It is to be noted that the number of the fluorescent lamps 33 is not limited to that shown in the figure and in some cases, the fluorescent lamp 33 may be replaced with a different type lamp. Each fluorescent lamp 33 is fixed using holders 34. A terminal portion of the fluorescent lamp 33 is connected to a connector substrate 35 through a connector 36, to be applied with a specific power. A reflection plate 37 formed in a corrugated shape in cross-section is mounted on the back surfaces of the fluorescent lamps 33 for reflecting illumination light emitted from the fluorescent lamps 33 forward. The case 31 containing the fluorescent lamps 33 and the reflection plate 37 is enclosed by a light diffusion plate 32. The light diffusion plate 32 serves not only as a cover for the case 31 but also as a member for reducing unevenness of a light emission distribution of the fluorescent lamps 33. The light diffusion plate 32 is so configured that the diffusion effect is relatively low and the transmittance is high. The light diffusion plate 32 is made from, for example, acrylic resin in which light-diffusible fine particles are dispersed.

Figure 4:
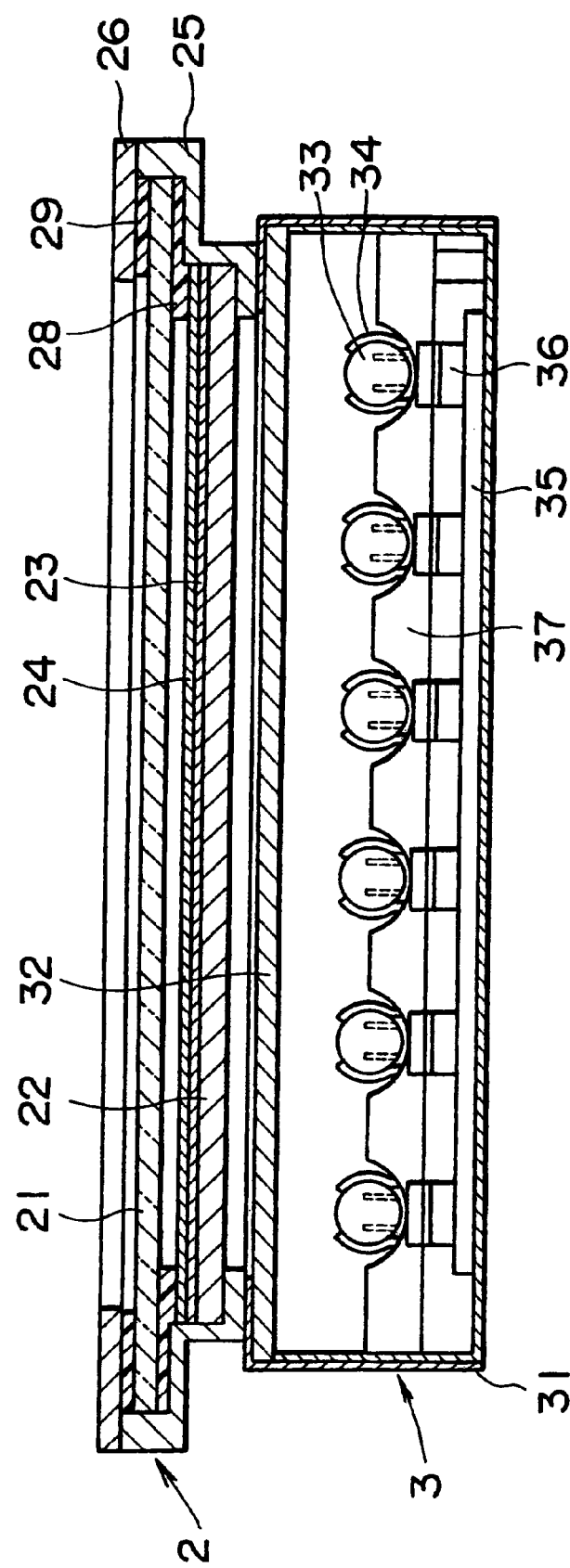
FIG. 4 is a typical sectional view showing a state in which the display unit is laminated on the back light unit.

FIG. 4 is a typical view showing a state in which the display unit 2 is laminated on the back light unit 3 in the flat display set. The back light unit 3 has the light diffusion plate 32 mounted on the front side thereof, and the display unit 2 has the light diffusion plate 22 mounted on the back surface thereof. In this way, according to the present invention, there are used two kinds of the light diffusion plates 22 and 32, between which there exists a gap. Such a structure using the double light diffusion plates increases an effect of insulating heat flowing from the back light unit 3 to the display unit 2. The light diffusion plate 32 on the back light unit 3 side has a relatively low light-diffusivity and a high transmittance, while the light diffusion plate 22 on the display unit 2 side has a relatively high light-diffisivity and a low transmittance. In other words, the density of light diffusible fine particles dispersed in the light diffusion plate is relatively low, and the density of light diffusible fine particles dispersed in the light diffusion plate 22 is relatively high. By increasing a gradient of the density of light diffusible fine particles from the back light unit 3 side to the display unit 2 side, the brightness of the back light unit 3 as the surface light source becomes higher than that of a back light unit using one light diffusion plate. Further, as compared with the dispersion of light diffusible fine particles in one light diffusion plate at a high density, the dispersion of the light diffusible fine particles in the same amount in the two light diffusion plates 22 and 32 at low densities is more effective to enhance the brightness as the surface light source. Additionally, by allowing illumination light emitted from the back light unit 3 side to pass through the two light diffusion plates 22 and 32, it is possible to relieve the structural unevenness of the fluorescent lamps 33 arranged at specific intervals, and hence to ensure a uniform brightness of the back light unit 3 as the surface light source.

Figure 5:
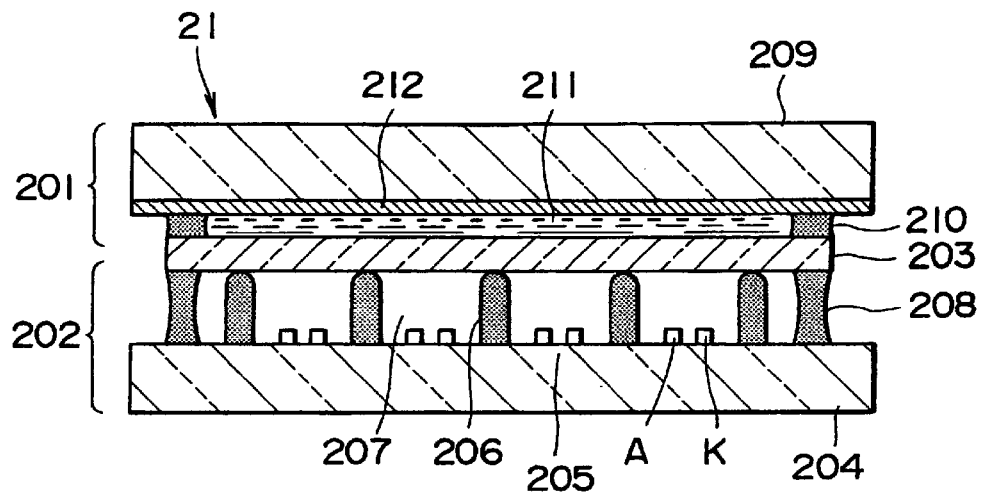
FIG. 5 is a sectional view showing a detail configuration example of a liquid crystal panel assembled in the display unit shown in FIGS. 2A and 2B.

FIG. 5 is a typical sectional view showing a detailed configuration example of the liquid crystal panel 21 shown in FIGS. 2A and 2B. The liquid crystal panel 21 of a plasma addressed type has a flat panel structure including a liquid crystal cell 201, a plasma cell 202, and an intermediate substrate 203 interposed therebetween. The intermediate substrate 203, called a micro-sheet, is formed of a very thin glass plate. The plasma cell 202 has a lower substrate 204 joined to the intermediate substrate 203, and an ionizable gas is sealed therebetween. On the inner surface of the lower substrate 204, are formed stripe-shaped discharge electrodes 205. The discharge electrodes 205 can be finely printed and baked on the flat substrate 204 with excellent productivity and workability by a screen printing process. Partition walls 206 are also formed on the lower substrate 204, and partition the above gap in which the ionizable gas is sealed, to form discharge channels 207. The partition walls 206 can be also printed and baked by the screen printing process. The top portions of the partition walls 206 are brought in contact with one surface side of the intermediate substrate 203. The stripe-shaped discharge electrodes 205 alternately function as anodes A and cathodes K. A plasma is generated between the anode A and the cathode K. In addition, the intermediate substrate 203 is joined on the lower substrate 204 with glass frit 208 or the like.

On the other hand, the liquid crystal cell 201 has a transparent upper substrate 209. The upper substrate 209 is adhesively bonded on the other surface side of the intermediate substrate 203 with a specific gap put therebetween using a sealant 210. The gap is filled with liquid crystal 211. On the inner surface of the upper substrate 209, is formed transparent electrodes 212. The transparent electrodes 212 cross the stripe-shaped discharge electrodes 205 at right angles. Matrix-like pixels are defined at crossing points between the transparent electrodes 212 and discharge channels 207. The liquid crystal panel 21 in this embodiment thus includes scanning lines composed of the discharge channel 207 extending in the horizontal direction of the screen and arranged with a specific pitch in the vertical direction, signal lines composed of the transparent electrodes 212 extending in the vertical direction and arranged with a specific pitch in the horizontal direction, and the pixels composed of the liquid crystal 211 interposed at the crossing points between the scanning lines and the signal lines.

The plasma addressed type liquid crystal panel 21 having the above configuration is driven such that rows of the discharge channels 207 for performing plasma discharge are scanned switchingly in line-sequence, and columns of the transparent electrodes 202 on the liquid crystal cell 201 side are applied with an image signal simultaneously with the scanning of the discharge channels 207. When a plasma is generated in each discharge channel 207, the interior of the discharge channel 207 has a substantially uniform anode potential, that is, pixel selection is performed for each row. In other words, the discharge channel 207 functions as a sampling switch. When an image signal is applied to each pixel in a state when the plasma sampling switch is made conductive, sampling is effected, to thus control lighting-up/off of the pixel. When the plasma sampling witch is turned into the non-conductive state, the image signal remains held in the pixel.

Figure 6:
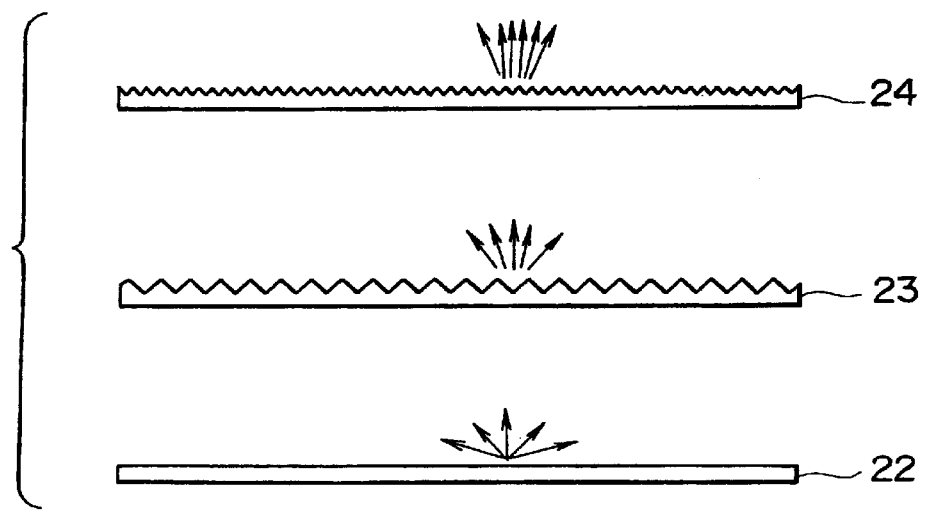
FIG. 6 is a typical view showing an arrangement of optical parts assembled in the display unit shown in FIGS. 2A and 2B.

FIG. 6 is a typical view showing a state in which plate-like optical parts contained in the back light unit 3 are taken out of the unit 3. The optical parts assembled in the back light unit 3 are, as described above, the one light diffusion plate 22 and the two prism sheets 23 and 24. The light diffusion plate 22 functions to diffuse illumination light in both the horizontal and vertical directions, and hence to equalize the brightness distribution of the screen. On the other hand, the two prism sheet 23 and 24 function to collect the illumination light, which has been once diffused by the light diffusion plate 22, in the vertical direction. In particular, by lamination of the two prism sheets 23 and 24, the frontal brightness is enhanced. Further, by changing the pitches of micro-prisms formed in the two prism sheets 23 and 24 each other, it becomes possible to suppress a side reaction such as moire. In this way, according to the present invention, illumination light is collected in the vertical direction of the screen by use of the prism sheets 23 and 24. As is apparent from FIG. 5, the discharge channels 207 extend in the vertical direction of the screen and are arranged with a specific pitch in the horizontal direction of the screen. Accordingly, by previously collecting illumination light in the vertical direction by the prism sheets 23 and 24, it is possible to enhance the illumination efficiency for the plasma cell 202, and hence to significantly improve the frontal brightness of the liquid crystal panel 21.

While the preferred embodiment of the present invention has been described using specific terms, such description is for illustrative purposes only, and it is to be understood that changes and variations may be made without departing from the spirit or scope of the following claims.

What is claimed is:

1. A flat display, comprising:
  a frame positioned on a front side of said flat display and formed with a window portion;
  a display unit having a transmission type flat panel, said display unit being assembled from a rear side to said frame in such a manner as to be matched with said window portion to form a display screen;
  a chassis positioned on the rear side of said flat display, said chassis being engaged with said frame with said display unit between said chassis and said frame to form a flat containing space on a back surface side of said display unit; and
  a back light unit as a surface light source for illuminating said display unit from the back surface side, said back light unit being pre-assembled using a flat case and removably insertable in said containing space.

2. A flat display according to claim 1, wherein said display unit includes:
  optical parts, formed in flat shapes, for diffusing and/or collecting illuminating light coming from said back light unit; and
  a liquid crystal panel for modulating the illumination light in accordance with an image signal and creating an image on the display screen;
  wherein said optical parts are separated from said back light unit and are joined to a back surface of said liquid crystal panel.

3. A flat display according to claim 2, wherein said optical parts include:
  a light diffusion plate for diffusing illumination light in both vertical and horizontal directions of the display screen; and a prism sheet for collecting the illumination light, which has been once diffused, at least in the vertical direction.

4. A flat display according to claim 2, wherein said liquid crystal panel includes:
scanning lines composed of discharge channels extending in a horizontal direction and arranged with a specific pitch in a vertical direction;
signal lines composed of signal electrodes extending in the vertical direction and arranged with a specific pitch in the horizontal direction; and
pixels composed of liquid crystal, interposed at crossing points between said scanning lines and said signal lines.

5. A flat display according to claim 1, wherein said back light unit has a light diffusion plate having a relatively high light-transmittance and mounted on a front side of said back light unit.

6. A flat display according to claim 5, wherein said display unit has a light diffusion plate having a relatively low light-transmittance and mounted on a rear surface of said display unit.

7. A flat display according to claim 2, wherein said display unit has a structure in which a space formed between said liquid crystal panel and said optical parts are enclosed from an exterior.

8. A flat display as claimed in claim 1, wherein said back light unit includes a plurality of elongated lamps arranged parallel to one another and position at said back surface side of said display unit.

* * * * *